United States Patent
Hinc et al.

(10) Patent No.: US 10,022,929 B2
(45) Date of Patent: Jul. 17, 2018

(54) TYRE AND METHOD OF MANUFACTURING A TYRE TRIANGULATION BELT

(71) Applicants: COMPAGNIE GENERALE DES ETABLISSEMENTS MICHELIN, Clermont-Ferrant (FR); Michelin Recherche et Technique S.A., Granges-Paccot (CH)

(72) Inventors: Henri Hinc, Clermont-Ferrand (FR); Christian Beaudonnet, Clermont-Ferrand (FR); Francis Aubarede, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 485 days.

(21) Appl. No.: 14/366,064

(22) PCT Filed: Dec. 12, 2012

(86) PCT No.: PCT/EP2012/075161
§ 371 (c)(1),
(2) Date: Jun. 17, 2014

(87) PCT Pub. No.: WO2013/092326
PCT Pub. Date: Jun. 27, 2013

(65) Prior Publication Data
US 2015/0068656 A1    Mar. 12, 2015

(30) Foreign Application Priority Data
Dec. 19, 2011  (FR) .................................. 11 61908

(51) Int. Cl.
| | | |
|---|---|---|
| B60C 9/18 | (2006.01) | |
| B60C 9/20 | (2006.01) | |
| B60C 9/28 | (2006.01) | |
| B29D 30/06 | (2006.01) | |
| B26D 3/00 | (2006.01) | |
| B26D 3/12 | (2006.01) | |
| B29K 21/00 | (2006.01) | |

(Continued)

(52) U.S. Cl.
CPC ......... B29D 30/0681 (2013.01); B26D 3/003 (2013.01); B26D 3/12 (2013.01);
(Continued)

(58) Field of Classification Search
CPC ............ B60C 9/18; B60C 9/1807; B60C 9/28
See application file for complete search history.

(56) References Cited

U.S. PATENT DOCUMENTS 5,038,999 A    8/1991  Dicker ............................ 229/69
5,618,362 A    4/1997  Janus et al. ................... 152/530
(Continued)

FOREIGN PATENT DOCUMENTS

DE    840 497        6/1952
EP    0 447 273 A2   9/1991
(Continued)

Primary Examiner — Justin R Fischer
(74) Attorney, Agent, or Firm — Fitzpatrick, Cella, Harper & Scinto (57) ABSTRACT

A crown reinforcement of a tyre includes at least one crown triangulation belt having a given width value (R). The belt essentially includes elementary widths each having a given width value (B). Each of the elementary widths has a flattened cross section and forms an angle ($\alpha$) with a circumferential direction of the tyre, the angle ($\alpha$) being between 10° and 80°. Adjacent elementary widths, which are positioned directly next to each other, are separated by a groove of a given width value (j) and are connected to each other by one or more weak bridges.

18 Claims, 7 Drawing Sheets

(51) Int. Cl.
*B29K 105/24* (2006.01)
*B60C 1/00* (2006.01)

(52) U.S. Cl.
CPC ............... *B60C 9/18* (2013.01); *B60C 9/28* (2013.01); *B29K 2021/00* (2013.01); *B29K 2105/246* (2013.01); *B60C 2001/0066* (2013.01); *B60C 2009/2035* (2013.01); *Y10T 83/0586* (2015.04); *Y10T 152/1081* (2015.01); *Y10T 152/10765* (2015.01)

(56) References Cited

U.S. PATENT DOCUMENTS

| | | | | |
|---|---|---|---|---|
| 6,029,725 | A | * | 2/2000 | Mani ................. B60C 9/18 152/197 |
| 7,434,500 | B2 | | 10/2008 | Dale' et al. ................. 83/52 |
| 8,424,673 | B2 | | 4/2013 | Ravat et al. ................. 198/679 |
| 2012/0090755 | A1 | | 4/2012 | Deal ................. 152/527 |
| 2012/0090756 | A1 | | 4/2012 | Le Clerc ................. 152/527 |
| 2013/0199349 | A1 | | 8/2013 | Ravat et al. ................. 83/14 |

FOREIGN PATENT DOCUMENTS

| | | |
|---|---|---|
| EP | 0 664 229 A1 | 7/1995 |
| GB | 482754 | 4/1938 |
| GB | 1 305 829 | 2/1973 |
| GB | 1 535 689 | 12/1978 |
| JP | 2005-161851 A | 6/2005 |
| WO | WO 2010/049266 A1 | 5/2010 |
| WO | WO 2010/115860 A1 | 10/2010 |
| WO | WO 2010/115861 A1 | 10/2010 |
| WO | WO 2011/076558 A1 | 6/2011 |

\* cited by examiner

TYRE AND METHOD OF MANUFACTURING A TYRE TRIANGULATION BELT

FIELD OF THE INVENTION

The invention relates to the field of tyre manufacture and more particularly to the steps of the tyre-building process during which steps the components intended to form the crown reinforcing belt are created.

RELATED ART

Publication WO 2010/115860 describes a tyre in which the crown reinforcing belt is formed by the collaboration of the carcass reinforcing ply with reinforcers parallel to the circumferential direction of the tyre, and with a triangulation belt essentially consisting of elementary widths of flattened cross section forming a given angle with the circumferential direction of the tyre. These widths take the form of flat strips juxtaposed next to one another in the circumferential direction, and make a given angle with the said circumferential direction.

The elementary widths can be obtained from metal, composite or polymer tapes. By way of example, publication WO2010/115861 describes particularly advantageous types of materials suited to this use, and produced from multilayer laminated elements comprising at least one multiaxially stretched thermoplastic film.

It must be pointed out at this stage that creating a green tyre comprising a triangulation belt of the type described in the abovementioned patent application and calling for these elementary widths to be laid one by one, using a strip of a width equal to the width of the elementary widths, entails the design of means suited to this operation.

BRIEF DESCRIPTION OF THE INVENTION

It is an object of the present application to describe a method of creating a green tyre comprising triangulation belts of the above type that offers the advantage that it can be carried out without the need to make extensive modifications to the tyre-building devices currently used within the industry.

The invention proposes a slight modification to the construction of the triangulation belt and making practical use of the nature of the materials of which it is made.

The tyre according to the invention has a crown reinforcement comprising at least one crown triangulation belt of given width essentially consisting of elementary widths of flattened cross section of given width forming an angle comprised between 10° and 80° with the circumferential direction of the tyre and separated by a through-groove of given width. This tyre is characterized in that each elementary width is connected by one or more weak bridges to at least one of the elementary widths which is juxtaposed directly next to it.

What is meant here by weak is the property that the materials of which the bridges are made have to break under the effect of the mechanical stresses applied to them. The breaking of the said bridges, which form localized points of weakness, requires only a small amount of energy. In the particular case of the tyre and of the present application, the bridges are considered to break during the shaping in the press and the circumferential tensioning of the green tyre, during the pressurizing of the casing during the assembly operation, and the last few bridges are considered to yield after the first few kilometers of running without that affecting the performance of the tyre during this short period.

Thus, once all of the bridges connecting the elementary widths to one another have completely broken, the configuration of the tyre is identical to that of the tyre described in the abovementioned publication WO2010/115861.

The invention, as will be seen hereinafter, therefore addresses the matter of defining bridges the geometry of which is compatible with the weakness requirement set out hereinabove, so as to ensure that they break in the very first stage of use of the tyre.

For preference, the crown reinforcement is made up of the said triangulation belt, of the carcass reinforcing threads oriented radially and connecting the two beads, and of a hooping belt essentially consisting of reinforcers which are parallel to the circumferential direction.

For preference, the grooves are rectilinear.

For preference, the elementary widths are formed from a sheet of metallic material, of a polymer or of a multilayer composite comprising at least one film of multiaxially stretched thermoplastic.

The method of manufacturing a continuous strip intended for the manufacture of the crown triangulation belt of a tyre according to the invention provides for the steps during which:

a continuous primary strip of given width is paid out,
using a cutting means, non-continuous mutually-parallel through-grooves of a given width and a given length are made at a defined spacing and at a predefined angle of between 0° and 90° to the longitudinal direction of the primary strip so that the space separating two collinear grooves forms a weak bridge of given length, so as to form a slit continuous strip.

Thus is obtained a continuous strip intended for the manufacture of the crown triangulation belt of a tyre, comprising grooves that pass right through the said strip and are interrupted by bridges that allow the strip to maintain its continuous nature. This strip can therefore be wound up and paid out for convenience of use in the later steps of the method.

When the strip does not have any particular properties of adhesion to a rubber composition, following the steps described hereinabove, the faces of the slit continuous strip are coated with a composition able to encourage adhesion between the surface of the strip and a rubber composition.

According to a first embodiment of the method, when seeking to use primary strips of great width, steps are taken to ensure that the angle of the grooves with respect to the longitudinal direction of the primary strip is equal to zero, and, following the preceding steps:

using a calendering means, a layer of a rubber composition is applied to at least one face of the slit and/or coated primary strip to form a slit and calendered strip,
the slit and calendered primary strip is cut into elementary sections along a cutting line making a given angle α with the longitudinal direction of the slit and calendered strip,
the said elementary sections are butted together along their respective selvedges to form a final continuous strip of given width, in which strip the grooves make a given angle with the longitudinal direction of the final continuous strip,
a section the length of which corresponds substantially to the circumference of the crown of a tyre is taken from the said final continuous strip and the said portion is wrapped around a tyre-building drum to form a green form of a crown triangulation belt of given width comprising elementary widths making an angle α with the circumferential direction.

Alternatively, according to a second embodiment of the method, it is possible to elect to slit the primary continuous strip by making grooves that make an angle α with respect to the longitudinal direction of the primary strip that is greater than zero so as directly to form a final continuous strip and, following the steps of creating the grooves, to undertake the steps during which:

a section the length of which corresponds substantially to the circumference of the crown of a tyre is taken from the said final continuous strip of given width corresponding to the width of the triangulation belt and the said portion is wrapped around a tyre-building drum to form a green form of a crown triangulation belt comprising elementary widths making an angle α with the circumferential direction.

It is then possible to arrange the position of the grooves and of the bridges in such a way that it is possible to join at least three bridges with at least one line making a given angle greater than or equal to zero with the longitudinal direction of the final strip without the said line or lines being secant to a single groove.

Provision may also be made for the lateral grooves arranged on the two lateral parts of the final continuous strip to be open-ended.

When the meridian profile of the tyre is significantly curved, it may be beneficial to make provision for the width of the end of the lateral grooves situated on the open-ended side to be greater than the width of the end of the lateral grooves situated on the internal side of the final continuous strip For preference, the distance between two consecutive grooves corresponds to the width of an elementary width.

For preference, the grooves are rectilinear.

For preference, the orthogonal distance between the grooves is variable.

BRIEF DESCRIPTION OF THE DRAWINGS

The description which follows relies on FIGS. 1 to 17 in which:

FIG. 9 depicts a view in cross section of a strip and of a selvedge of a strip after calendering, FIG. 10 depicts a simplified view of a device for building the crown belt of a tyre.

DETAILED DESCRIPTION OF EMBODIMENTS OF THE INVENTION

Figure 1:
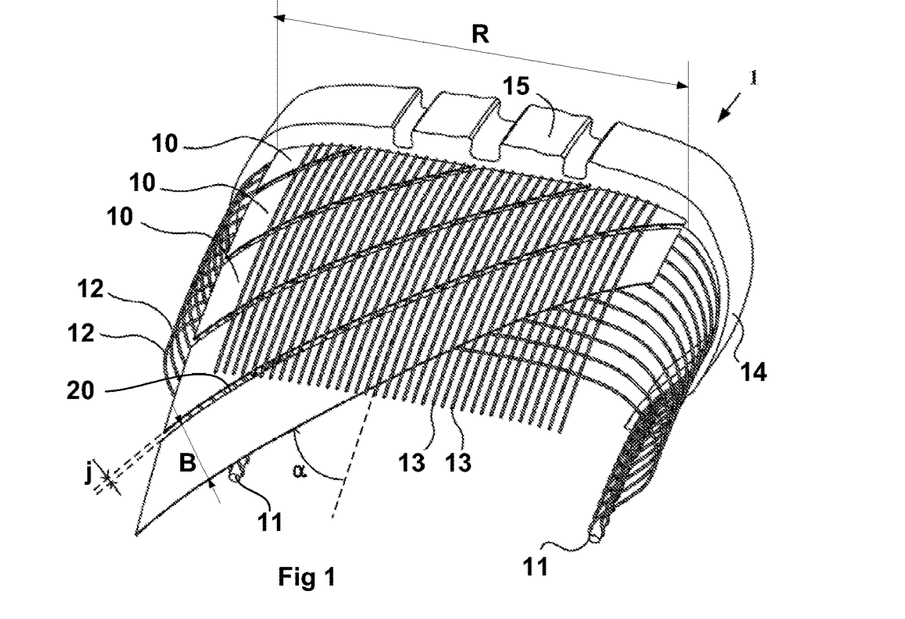
FIG. 1 depicts a view with cutaway of a tyre according to the prior art.

FIG. 1 depicts a tyre 1 as described in application WO2010/115861, comprising a crown reinforcement made up of a triangulation belt of width R, formed of elementary widths 10 of width B, juxtaposed next to one another and forming an angle α with the circumferential direction. The space between the elementary widths forms a continuous groove of width j.

The angle α is comprised between 10° and 80° and preferably comprised between 25° and 60°. The orthogonal distance j between two elementary widths is less than the sum of their half-widths, preferably less than the sum of their half-widths by a value equal to at least four times the maximum thickness e of the said elementary widths.

The width B of the elementary widths is at least equal to five times their thickness e and preferably at least equal to 20 times their maximum thickness.

The elementary widths may be formed from a sheet of metal, of a polymer, of a thermoplastic polymer such as a multiaxially stretched polyethylene terephthalate for example. The elementary widths preferably have a tensile modulus in excess of 1 GPa.

The crown reinforcement also comprises carcass reinforcing threads 12, oriented radially and connecting the two beads 11, and a hooping belt formed of threads 13 wound around the triangulation belt and making an angle of zero value with the circumferential direction. The hooping belt may be applied radially on top of or underneath the triangulation belt, or even on both sides of the said triangulation belt. The lateral parts of the tyre are protected by the sidewall rubbers 14, and the crown reinforcing belt is capped by a tread 15.

Figure 2:
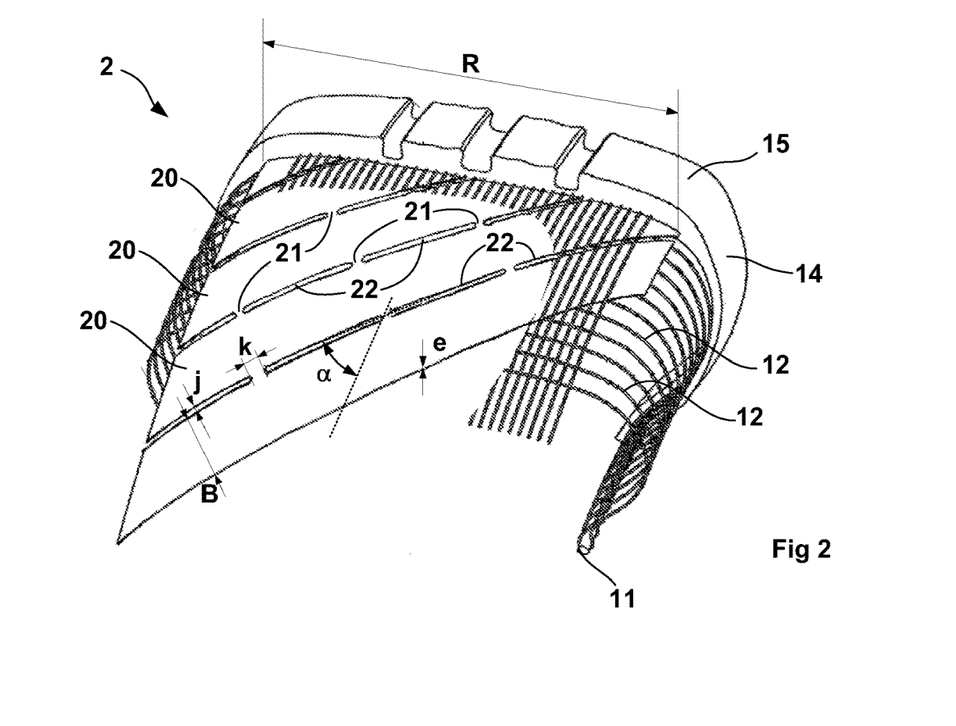
FIG. 2 depicts a view with cutaway of a tyre according to the invention.

The tyre 2 according to the invention is depicted in FIG. 2. This tyre differs from the tyre 1 depicted in FIG. 1 only in that the groove 22 of width j separating two elementary widths 20 is interrupted by bridges 21 of width k.

The width k of the bridges is suited to meeting two contradictory requirements.

The first requirement demands that the width of the bridges 21 be small enough that they can break easily during the first few turns of the wheel that the tyre is fitted to or when the green tyre is subjected to stress such as the shaping in the press. In this regard, it has been determined experimentally that the width of the bridges should not exceed a value equal to 10% of the width R of the ply divided by the sine of the angle α and by the number n of bridges connecting two elementary widths, i.e. $k \leq 0.1 \times R/(n \times \sin \alpha)$, and preferably remain less than or equal to 5% of the width R of the ply divided by the sine of the angle α and by the number n of bridges connecting two elementary widths, i.e. $k \leq 0.05 \times R/(n \times \sin \alpha)$.

What this amounts to in practice is selecting a value of k that is less than or equal to four times and preferably less than or equal to twice the thickness e of an elementary width.

It is also found that a low value of width k is also sufficient to withstand the tensile forces applied to the slit continuous strip during the stages of the process.

The second requirement dictates that the bridges 21 be strong enough to withstand the compressive loadings that the slit strip is likely to experience, particularly during the calendering operations or even handling during handling or transfer operations and which have the effect of causing the bridges to bend and the geometry of the grooves to alter.

Thus, taking into consideration the nature (metal, composite) and specific thickness (e) of the continuous strip which are chosen for the creation of the triangulation belt, prior testing ought to be carried out in order to ensure that the slit continuous strip can be used without being degraded by the process and that the bridges will break after at most twenty or so successive bendings have been applied or after a tensile force higher than the forces observed on tyre-building machines has been applied and will not buckle under the effect of the compression forces encountered during the calendering process.

By way of example, for a triangulation belt 150 mm wide, formed of elementary widths of PET with a thickness (e) of 0.5 mm, the elementary widths of which are spaced by 2 mm (j) and connected by 5 bridges (21), a bridge width (k) of 2 mm allows both of the abovementioned requirements to be satisfied.

The following description proposes two preferred embodiments of the method of producing a crown reinforcement.

According to a first embodiment, the method plans to pay out a continuous primary strip of width L very much greater than the width R of the triangulation belt.

Figure 3:
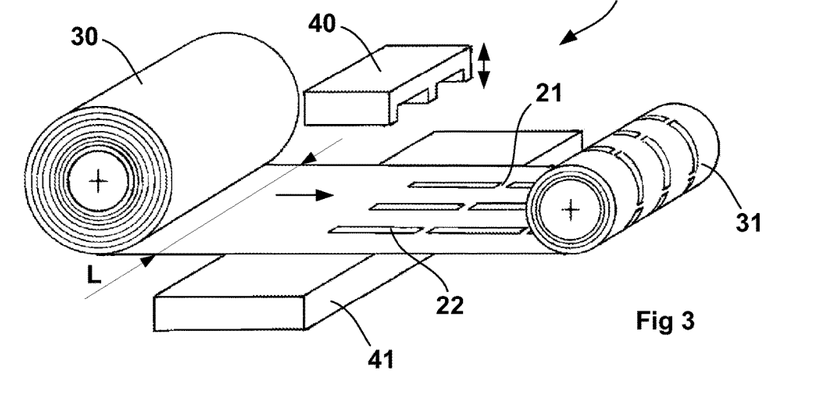
FIG. 3 depicts a simplified perspective view of a device for creating the grooves according to a first embodiment of the invention.
Figure 4:
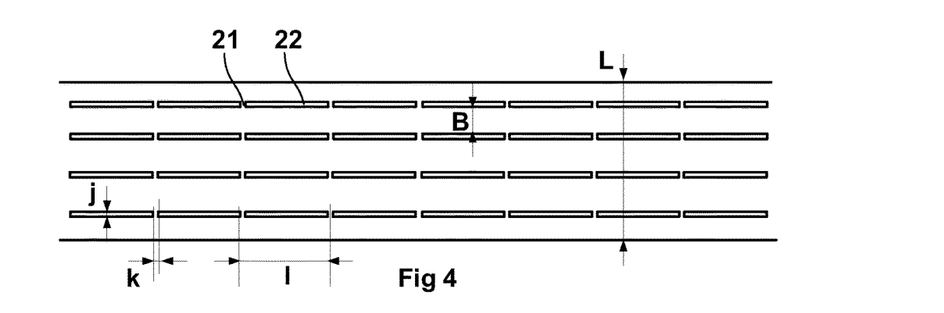
FIG. 4 depicts a view from above of a strip produced using the device of FIG. 3.

Using a cutting means 4, substantially rectilinear grooves 22 passing right through the strip are made at a defined spacing. The example of FIG. 3 plans for a punch 40 moving back and forth in a direction perpendicular to the plane of the strip and collaborating with an anvil 41. The grooves 22 are oriented in the longitudinal direction of the strip and are spaced transversely by a spacing B that corresponds to the width of an elementary width. The spacing between two punch strokes is adjusted so that two consecutive collinear grooves are spaced apart by a distance k that corresponds to the width of the bridges 21 connecting the elementary widths, as is illustrated in detail in FIG. 3.

The use of a punch and of an anvil is nonlimiting and the person skilled in the art can usefully resort to the various known cutting means such as, for example, cutting using a simple blade, cutting by milling, cutting by water jet, laser cutting, cutting by shearing, or even oxyacetylene cutting in the case where a strip made of metallic material is involved.

Figure 5:
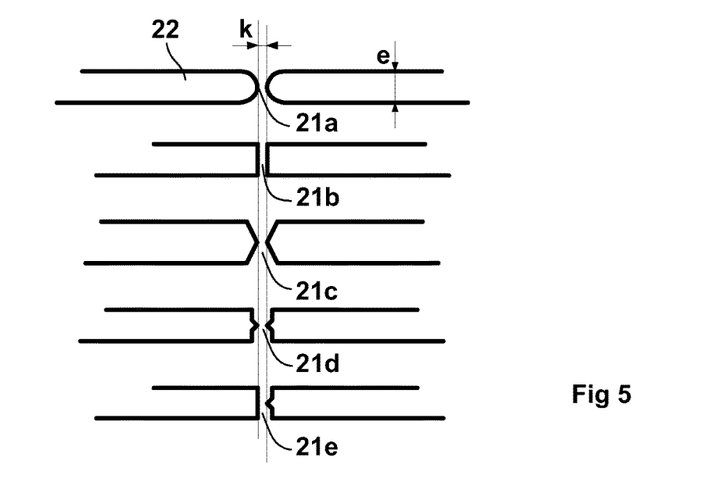
FIG. 5 depicts views from above of various embodiments of the bridges, FIG. 6 schematically depicts a device for the continuous coating of the strip, FIG. 7 schematically depicts a device for calendering the strip, FIG. 8 schematically depicts a cutting and butting device.

It goes without saying that the shape of the bridges can be adjusted to suit the applications and the nature of the materials used. FIG. 5 nonlimitingly illustrates different shapes of bridges 21 which may be suitable for the use required for implementation of the invention.

The bridges of width k may be of circular shape 21a, of rectangular shape 21b, of triangular or semi-triangular shape 21c, 21d respectively, or of a shape that combines two of the above shapes, such as the shape illustrated as 21e for example.

Likewise, the distance j may be zero, when the cutting of the grooves is performed using a simple blade.

Figure 7:
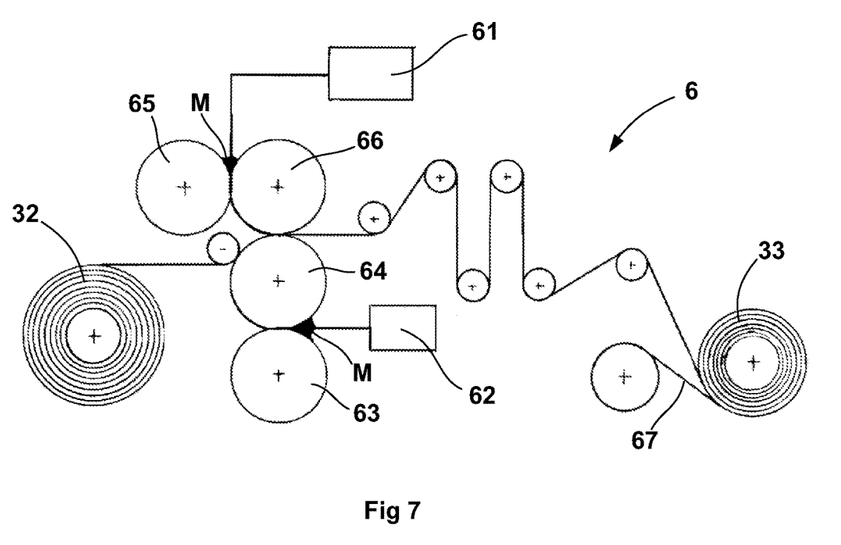

The next step in the process, according to this first embodiment, is to apply a layer formed of a rubber composition, for example using a calendering means such as the one depicted in FIG. 7.

Figure 6:
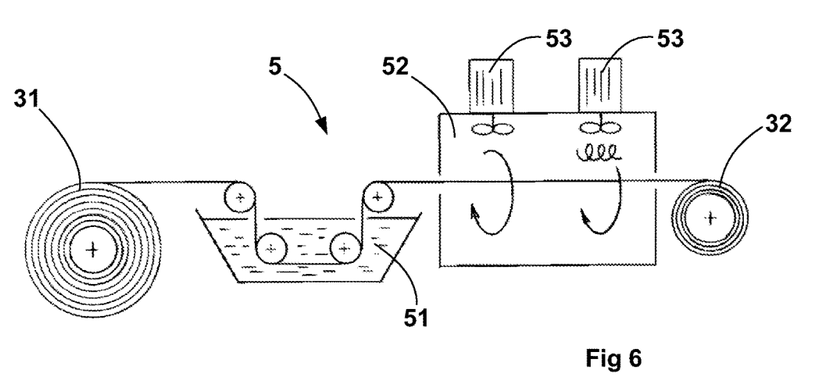

However, it may prove beneficial, when the material used to form the triangulation belt does not have particular properties that allow it to adhere to the rubber, to carry out a coating step as illustrated in FIG. 6, prior to the calendering step.

To encourage the adhesive to adhere to the surface of the strip, it may prove advantageous for the surface of the strip to be scored beforehand, to make it slightly rough.

The coating installation 5 has provision for the slit continuous strip to be circulated through a bath 51 containing an adhesive, for example of the RFL (Resorcinol, Formol Latex) type. Once coated, the strip passes through a drying chamber 52 in which fans 53 cause a high-temperature stream of air to circulate.

The next step is to apply a layer of rubber-based compound to one or both faces of the strip. The installation 6, known per se, comprises two pairs of cylinders 63, 64 and 65, 66 into the nip between which a mixture M of a rubber composition is introduced using a feed tool 61 and 62 respectively. Each pair of cylinders generates a thin sheet of rubber which is applied to the slit and coated continuous strip at the nip formed between the cylinders 64 and 66.

It is possible to conceive of a process in which the devices 4, 5 and 6 operate continuously without any need to repackage the strip leaving these devices. In practice though, the continuous primary strip 30 is repackaged as it leaves the slitting device 4 to form a slit continuous strip 31. This slit continuous strip 31 is arranged at the inlet of the coating device 5 then reconditioned at the exit of this device to form a slit and coated continuous strip 32. Finally, the strip 32 is placed at the entry to the calendering device 6 and reconditioned at the exit to form a slit and calendered strip 33. Because of the natural tack of the rubber compound, it may prove beneficial to arrange an interlayer 67 between the layers of the calendered strip 33.

Figures 8, 9, 10:
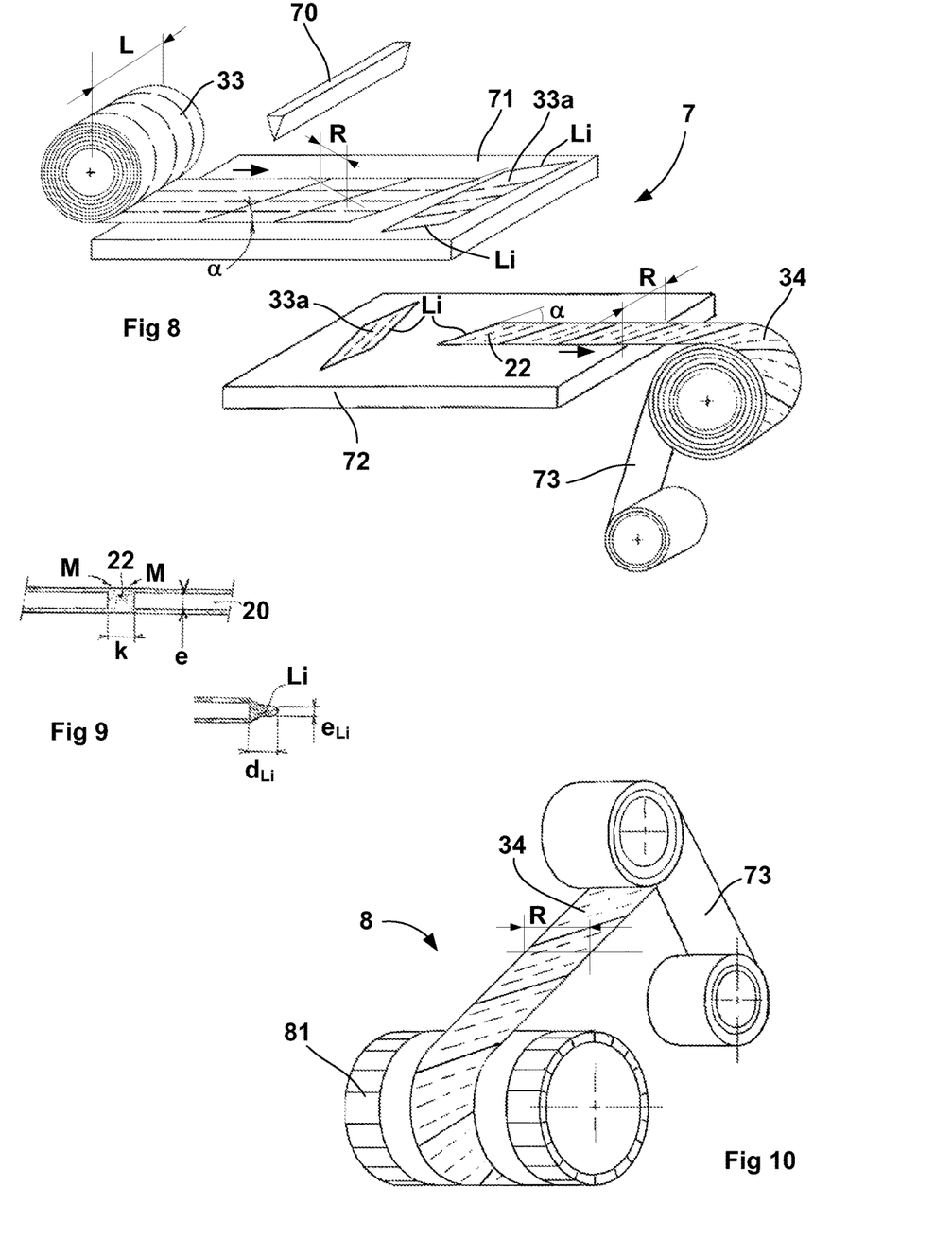

The strip 33 of width L is then conveyed to a cutting and assembling device 7, as shown in FIG. 8. A blade 70 collaborating with an anvil 71 cuts the strip 3 at a given angle α to the longitudinal direction of the strip. The cutting spacing is adjusted such that the orthogonal distance between two cutting lines is equal to the width R of the triangulation belt that is to be produced.

The elementary sections 33a are then assembled by their respective selvedges Li to form a final continuous strip 34, of width R, in which the grooves 22 make an angle α with the longitudinal direction of the strip 34. For the same reasons as those explained hereinabove, it may be beneficial to position an interlayer 73 between the layers of the final continuous strip 34.

It will be noted at this stage that the butting-together of the elementary sections is rendered possible by the presence of a selvedge Li, illustrated in greater detail in FIG. 9, and formed of an unvulcanized rubber composition that allows the elementary sections to be butt-joined together as is common practice in the tyre-building industry with the reinforcing plies formed of reinforcing threads embedded between two sheets of rubber.

The last stage in the process then consists in cutting from the final continuous strip sections the length of which corresponds substantially to the circumference of the crown of the tyre that is to be produced, in bringing the final continuous strip 34 onto a tyre-building device 8, and in applying the said section by wrapping it over a rotary drum 81, as shown in FIG. 10.

This method according to the first embodiment allows the use of initial strips of great width that can be slit and calendered using mass production facilities irrespective of the angle and width of the final slit and calendered continuous strip. The operation of cutting at an angle and of butting together the elementary sections can be performed at a later stage in the assembly process, according to the precise size of tyre that is to be produced.

However, this approach results in it being impossible to define the position and shape of the grooves in advance.

The solution to this problem is afforded by the second embodiment of the invention.

Figure 11:
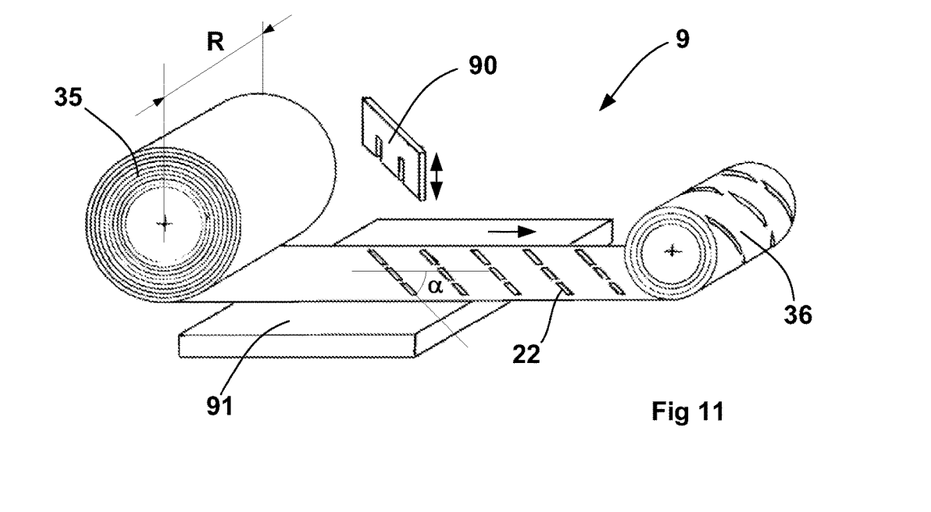
FIG. 11 depicts a simplified perspective view of a device for creating grooves according to a second embodiment of the invention.

According to this second embodiment, and with reference to FIG. 11, the cutting of the primary continuous strip 35 using a punch 90 collaborating with an anvil 91 is performed by inclining the through-grooves 22 by an angle α with respect to the longitudinal direction of the strip. That means that the said primary strip has a width R equal to the width of the belting strip intended to form the green tyre. In that context, the width k of the bridges 21 and the length l of the grooves 22 is dictated directly by the shape of the punch, and the spacing of the punch 90 is equal to $$\frac{B}{\sin\alpha},$$

where B represents the width of an elementary width and j the width of the groove 22.

The slit continuous strip 36 can then, if necessary, be coated with a composition (51) able to encourage adhesion between the surface of the strip and a rubber composition as illustrated in FIG. 6.

However, there is no benefit, as there was in the first embodiment of the method, in applying a layer of rubber compound. This is because there is no longer any need to cut the strip into elementary sections and butt these sections together along their selvedges.

Figure 12:
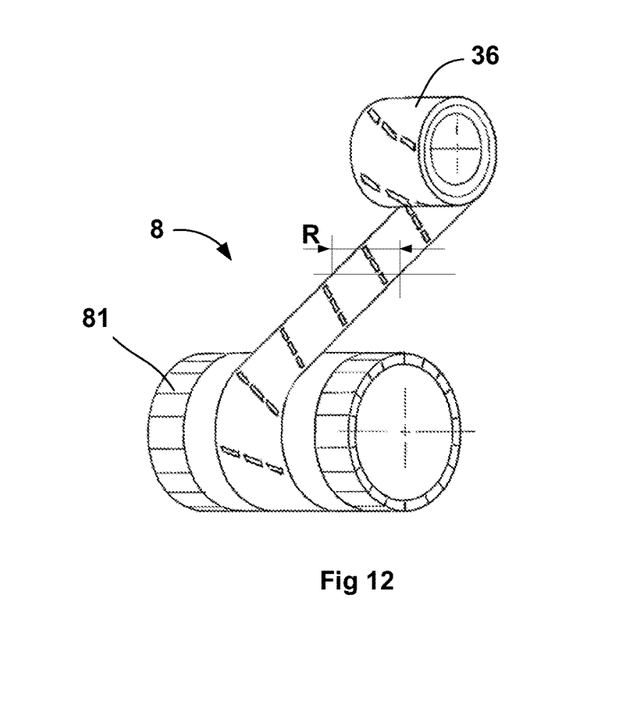
FIG. 12 depicts a simplified view of a device for building the crown belt of a tyre.

The slit and adhesive-coated strip can thus be used directly on the tyre-building device as illustrated in FIG. 12, during which a section, the length of which corresponds substantially to the circumference of the crown of a tyre, is taken from the said continuous strip 36, coated with adhesive beforehand if necessary, and the said section is wrapped over a tyre-building drum 81, so as to form the green form of the crown triangulation belt of width R and comprising elementary widths making an angle α with the circumferential direction.

The profiled elements or reinforcers placed radially on top of and underneath the triangulation belt, being themselves made of a rubber composition, then adhere directly to the triangulation belt.

It is also found that the second embodiment of the invention offers additional options with regard to the shape, number and position of the grooves and of the bridges, it being understood that these arrangements are conferred directly at the time of punching of the strip.

One first application is to locate the bridges 21 in a specific way relative to one another. More specifically, the position of the grooves 22 and of the bridges 21 is arranged so that it is possible to join at least three bridges using at least one line making a given angle β with the longitudinal direction of the final strip without the said lines being secant to a single groove 22. These lines are, as a general rule, parallel to one another.

Figures 13, 14:
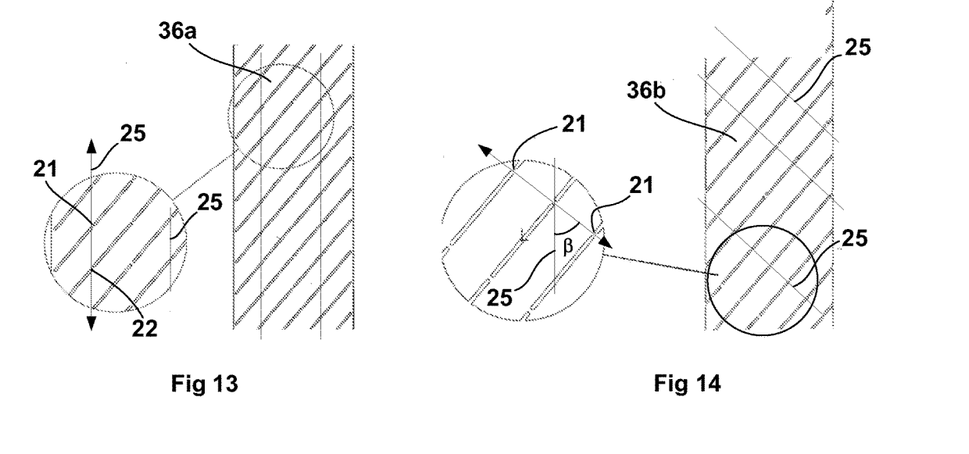
FIG. 13 depicts a view from above of a strip according to a first particular layout of the grooves and of the bridges.
FIG. 14 depicts a view from above of a strip according to a second particular layout of the grooves and of the bridges.

FIG. 13 illustrates a strip 36a in which the bridges 21 are aligned in the longitudinal direction of the strip, the angle β then being equal to zero. FIG. 14 illustrates the case of a strip 36b in which the lines make an angle β equal to −α with the longitudinal direction. It goes without saying that this angle β can be adjusted at will, and not imposed as in the first embodiment of the invention where the angle α of the grooves to the circumferential direction of the tyre is not known at the time of the punching and cutting of the grooves.

Figure 15:
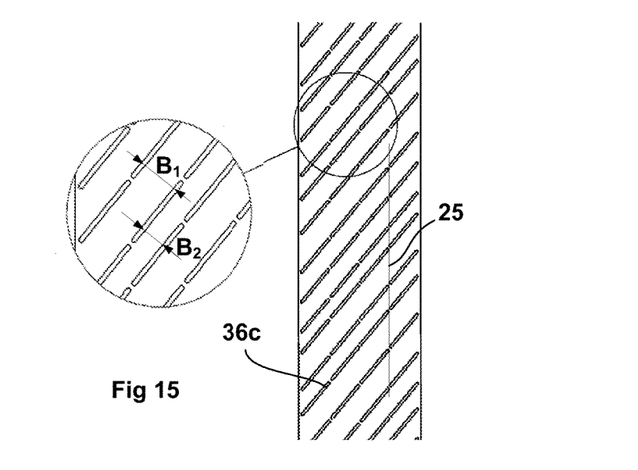
FIG. 15 depicts a view from above of a strip according to a third particular layout of the grooves and of the bridges.

FIG. 15 illustrates the case of a strip 36c in which the punch feed spacing is varied variably and in a known way and in which the orthogonal distance between two grooves is variable, the purpose of this being to produce elementary widths of variable width $B_1$ and $B_2$ respectively.

It will also be seen that the length l of the grooves 22 can be adjusted so that the value equal to $$\frac{R}{l \times \sin\alpha}$$

is a whole number representing the number of collinear grooves.

Figure 16:
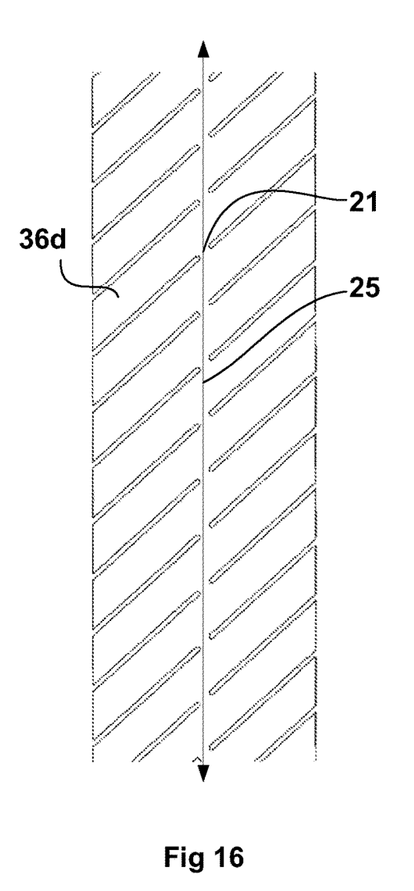
FIG. 16 depicts a view from above of a strip according to a fourth particular layout of the grooves and of the bridges.
Figure 17:
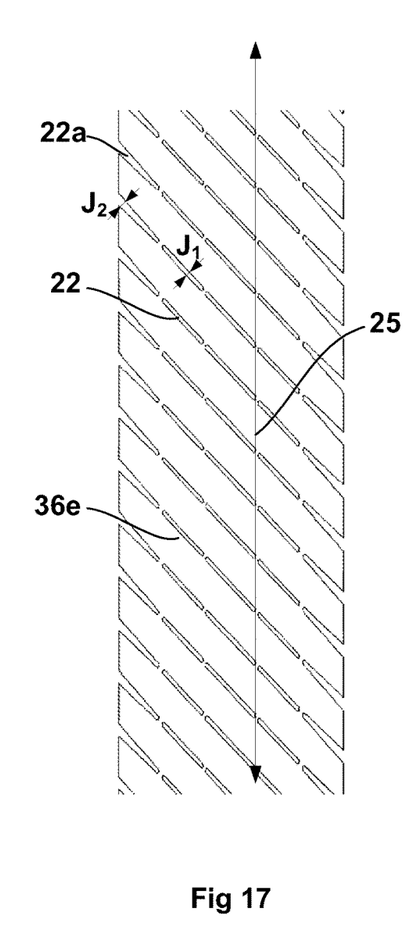
FIG. 17 depicts a view from above of a strip according to a fifth particular layout of the grooves and of the bridges.

Another alternative may provide for the end parts of the lateral grooves arranged along the two lateral parts of the final continuous strip to not be open-ended as illustrated in FIG. 13, 14 or 15 or to be open-ended as illustrated in FIGS. 16 and 17.

FIG. 16 also illustrates the case of a strip 36d in which the bridges 21 are aligned only by a single line, secant with no groove, and placed in a central position.

These special and nonlimiting arrangements of the bridges allow the mechanical properties of the continuous strip to be adapted to suit the stresses experienced during the carrying-out of the method according to the invention.

The strip 36d illustrated in FIG. 17 has the special feature of having open-ended lateral grooves of which the width $J_2$ of the end situated on the open-ended side is greater than the width $J_1$ of the end of the groove situated on the internal side of the final continuous strip. This embodiment is of special benefit when the triangulation belt formed from this strip is placed on a curved crown having a slightly rounded meridian profile and in which the circumference at the centre is, as a general rule, greater than the circumference at the shoulders. The special shape of the lateral grooves then allows the triangulation belt to accurately conform to the curved shape of the crown of the tyre.

The embodiments described hereinabove quite clearly are nonlimiting and the person skilled in the art will be able, particularly by using the second embodiment of the method according to the invention, to create all groove geometries likely to satisfy the needs expressed by tyre designers, up to and including shapes in which the collinear grooves are not rectilinear as illustrated in the figures used to support the present description but arranged in curved or broken lines.

The invention claimed is:

1. A method of manufacturing a tyre having a crown reinforcement including a crown triangulation belt, the method comprising steps of:
providing a final continuous strip having a given width value (R), in which the final continuous strip includes a plurality of elementary widths having a flattened cross section, in which each elementary width has a given width value (B), in which each elementary width forms an angle (α) being between 10° and 80° with a circumferential direction of the tyre, in which adjacent elementary widths are separated by a groove having a given width value (j), and in which adjacent elementary widths are connected to each other by one or more weak bridges;

wrapping a section of the final continuous strip around a tyre-building drum to form a green form of the crown triangulation belt having the given width value (R) and including the elementary widths that make the angle (α) with the circumferential direction of the tyre, a length of the section corresponding substantially to a circumference of a crown portion of the tyre;

completing an assembly operation of the tyre to obtain a green tyre; and shaping the green tyre in a press so that at least one weak bridge is broken.

2. The method according to claim 1, wherein the method further comprises a step of, after the shaping step, running the tyre for a first kilometer, wherein all remaining weak bridges become broken.

3. The method according to claim 1, wherein the method further comprises steps of, prior to the providing step:

providing a continuous primary strip having a given width value (L) and a given thickness value (e); and cutting the continuous primary strip using a cutting apparatus to form a slit continuous strip having non-continuous, mutually parallel, through-grooves therein, each of the through-grooves having a given width value (j) and a given length value (l), the through-grooves being positioned at a defined spacing and at a predefined angle of between 0° and 90° to a longitudinal direction of the continuous primary strip, such that a space separating two collinear through-grooves forms a weak bridge having a given width value (k).

4. The method according to claim 3, wherein the width value (k) of the bridge is less than four times the thickness value (e) of the continuous primary strip, with less than twice the thickness value (e) of the continuous primary strip being preferable for the width value (k).

5. The method according to claim 3, further comprising a step of, after the cutting step, coating surfaces of the slit continuous strip to form a coated continuous strip, the surfaces being coated with a composition that promotes adhesion between the coated continuous strip and a rubber composition.

6. The method according to claim 5,
wherein the angle of the through-grooves with respect to the longitudinal direction of the continuous primary strip is equal to zero, and
wherein the method further comprises steps of, after the coating step:
applying, using a calendering apparatus, a layer of the rubber composition to at least one surface of the coated continuous strip to form a calendered continuous strip;
cutting the calendered continuous strip into elementary sections along a cutting line that makes the angle (α) with a longitudinal direction of the calendered continuous strip, each of the elementary sections including at least one selvedge; and
butting the elementary sections together along their respective selvedges to form the final continuous strip of having the given width value (R), wherein the through-grooves make the angle (α) with a longitudinal direction of the final continuous strip.

7. The method according to claim 5,
wherein the angle of the through-grooves with respect to the longitudinal direction of the continuous primary strip is greater than zero, and
wherein the coated continuous strip is the final continuous strip.

8. The method according to claim 7, wherein the through-grooves and the bridges are arranged such that at least three bridges are joinable by at least one line making a given angle with a longitudinal direction of the final continuous without the at least one line being secant to a single one of the through-grooves.

9. The method according to claim 7, wherein lateral through-grooves arranged on lateral parts of the final continuous strip are open ended.

10. The method according to claim 9, wherein a width value (J2) of an end of a lateral through-groove situated on an open-ended side of the final continuous strip is greater than a width value (J1) of an end of a lateral through-groove situated on an internal side of the final continuous strip.

11. The method according to claim 3,
wherein the angle of the through-grooves with respect to the longitudinal direction of the continuous primary strip is equal to zero, and
wherein the method further comprises steps of, after the cutting step:
applying, using a calendering apparatus, a layer of a rubber composition to at least one surface of the slit continuous strip to form a calendered continuous strip;
cutting the calendered continuous strip into elementary sections along a cutting line that makes the angle (α) with a longitudinal direction of the calendered continuous strip, each of the elementary sections including at least one selvedge; and
butting the elementary sections together along their respective selvedges to form the final continuous strip of having the given width value (R), wherein the through-grooves make the angle (α) with a longitudinal direction of the final continuous strip.

12. The method according to claim 3,
wherein the angle of the through-grooves with respect to the longitudinal direction of the continuous primary strip is greater than zero, and
wherein the slit continuous strip is the final continuous strip.

13. The method according to claim 12, wherein the through-grooves and the bridges are arranged such that at least three bridges are joinable by at least one line making a given angle with a longitudinal direction of the final continuous without the at least one line being secant to a single one of the through-grooves.

14. The method according to claim 12, wherein lateral through-grooves arranged on lateral parts of the final continuous strip are open ended.

15. The method according to claim 14, wherein a width value (J2) of an end of a lateral through-groove situated on an open-ended side of the final continuous strip is greater than a width value (J1) of an end of a lateral through-groove situated on an internal side of the final continuous strip.

16. The method according to claim 3, wherein each through-groove is rectilinear.

17. The method according to claim 3, wherein an orthogonal distance between an adjacent pair of through-grooves varies from that of another adjacent pair of through-grooves.

18. The method according to claim 3, wherein the width value (k) of the bridge is given by ($k \leq 0.1 \times R/(n \times \sin \alpha)$), with ($k \leq 0.05 \times R/(n \times \sin \alpha)$) being preferable, n being a number of the bridge or bridges connecting adjacent elementary widths.

* * * * *